(12) United States Patent
Ikeuchi et al.

(10) Patent No.: US 6,522,533 B1
(45) Date of Patent: Feb. 18, 2003

(54) ACCESSORY OF ELECTRONIC DEVICE

(75) Inventors: Toshio Ikeuchi, Tottori (JP); Hidemi Dohi, Tottori (JP); Shoichi Sunagawa, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 152 days.

(21) Appl. No.: 09/787,428

(22) PCT Filed: Jul. 28, 2000

(86) PCT No.: PCT/JP99/05137

§ 371 (c)(1),
(2), (4) Date: Mar. 23, 2001

(87) PCT Pub. No.: WO00/17734

PCT Pub. Date: Mar. 30, 2000

(30) Foreign Application Priority Data

Sep. 24, 1998 (JP) .......................... 10-269596
Sep. 24, 1998 (JP) .......................... 10-269597

(51) Int. Cl.$^7$ ................................ G06F 1/16
(52) U.S. Cl. ............ 361/686; 361/680; 361/681; 361/683; 710/303; 710/304; 70/58; 70/57.1
(58) Field of Search ............... 361/683–686, 361/724–727; 395/186, 188.01, 43.12–43.22; 710/303, 304; 70/58, 57, 57.1

(56) References Cited

U.S. PATENT DOCUMENTS 5,313,596 A * 5/1994 Swindler et al. ............ 710/303
5,764,481 A * 6/1998 Ruch et al. .................. 361/685
5,784,253 A * 7/1998 Ooka et al. .................. 361/686
5,864,294 A * 1/1999 Hsu et al. .................... 340/635
5,933,322 A * 8/1999 Ruch et al. .................. 361/686
6,115,245 A * 9/2000 Ruch et al. .................. 361/685
6,119,184 A * 9/2000 Takahama .................... 710/303
6,275,378 B1 * 8/2001 Lee et al. .................... 361/686

FOREIGN PATENT DOCUMENTS

| JP | 7-334265 | 12/1995 |
| JP | 10-198459 | 7/1998 |

* cited by examiner

*Primary Examiner*—Darren Schuberg
*Assistant Examiner*—Lisa Lea-Edmonds
(74) *Attorney, Agent, or Firm*—Arent Fox Kintner Plotkin & Kahn, PLLC (57) ABSTRACT

The function of an electronic device (e.g., a portable personal computer) (5) is extended when the electronic device is mounted on an accessory (1). An operation lever (37) attached to the accessory (1) is operated to separate the electronic device (5) from the accessory (1). Operation parts (30, 31) are operated to take out mechanical equipment (8, 15) housed in the accessory (1). There is a setting which enables both the operation lever (37) and the operation parts (30, 31) to be operated, a setting which enables the operation lever (37) to be operated and unables the operation parts (30, 31) to be operated, and a setting which unables both the operation lever (37) and the operation parts (30, 31) to be operated. The user can select a desired setting by position operation of a lock object selecting part (46). The position operation of the lock object selecting part (46) is inhibited by inserting a key (10) into a locking part (9) attached to the accessory (1) and by turning the key (10).

12 Claims, 10 Drawing Sheets

ACCESSORY OF ELECTRONIC DEVICE

DESCRIPTION

1. Technical Field

This invention relates to an accessory for extending functions of an electronic device.

2. Background Art

JP 9-265333, A discloses an accessory mounted on an extending device and an electronic device mounted on the accessory. Mechanical equipment for extending functions of the electronic device such as a CD-ROM is installed in the extending device, and a PCMCIA card or the like can be inserted into the accessory.

The accessory is provided with a locking part. When the accessory is locked, a hook of the accessory locks the electronic device and a shutter of the accessory shuts an insertion mouth of the card. Such the locking operation prevents the electronic device and the card (the mechanical equipment) from being stolen.

However, the conventional device drives the hook in connection with the locking part. Therefore, when the electronic device and the card are removed from the accessory, it is required to insert the key into the locking part to unlock, resulting in inconvenience for a user. Furthermore, the device requires a complicated structure for transmitting rotating force and spring force of the key inserted in the locking part to the hook part and the shutter by the aid of a rotating member and a sliding plate or the like.

In ejecting the electronic device, the key is inserted in the locking part, is rotated by predetermined degrees to unlock the electronic device, and is further rotated to eject the electronic device. Such the two-time rotating operation of the key complicates operation for ejection. Furthermore, a special locking part for enabling predetermined operations with the two-time rotating operation is required.

DISCLOSURE OF INVENTION

An accessory of an electronic device of this invention comprises a main base including a mounting part for mounting an electronic device and a housing part for housing mechanical equipment, a catching part provided on the main base so as to move between a locking position for locking the mechanical equipment housed in the housing part and an unlocking position for unlocking the mechanical equipment, a first operation part provided on the main base for operating the catching part, a hook part provided on the main base so as to move between a locking position for locking the electronic device and an unlocking position for unlocking the electronic device, a second operation part provided on the main base for operating the hook part, a locking part provided detachably from the main base, and a lock object selecting means for changing a combination of operation allowance and operation inhibition of the first operation part and the second operation part by position operation.

With the above structure, the mechanical equipment housed in the housing part is locked and unlocked by the first operation part, and the electronic device is locked and unlocked by the second operation part. Therefore, the mechanical equipment and the electronic device are separately unlocked, and furthermore a special key conventionally required is not necessary. As a result, operability is improved. In addition, the lock object selecting means enables to select between an operation for prohibiting operation of the first operation part (inhibition of taking out the mechanical equipment) and for allowing operation of the second operation part (allowing of removing the electronic device), and an operation for prohibiting operation of both of the first and second operation parts. That is, a user can freely select a lock object. When the locking part and a desk or the like are linked with each other by a chain or the like, the accessory is prevented from being stolen.

The operation allowance and the operation inhibition of the first operation part and the second operation part by the lock object selecting means is achieved irrespective of locking and unlocking of the locking part. Therefore, the electronic device can be locked and unlocked by operating the second operation part even when the locking part is locked. Therefore, it is not necessary to use a key and operability can be improved.

Position operation of the lock object selecting means is not performed when the locking part is locked. When the locking part is locked with the lock object selected by the lock object selecting means, it is prevented that the lock object is changed or released by position operation of the lock object selecting means so that the electronic device and the mechanical equipment can be securely prevented from being stolen. Furthermore, it is not necessary to unlock the locking part in order to take out the mechanical equipment which is not the lock object so that operability can be improved.

An accessory of an electronic device comprises a main base including a mounting part for mounting an electronic device and a housing part for housing mechanical equipment, a catching part provided on the main base so as to move between a locking position for locking the mechanical equipment housed in the housing part and an unlocking position for unlocking the mechanical equipment, a first operation part provided on the main base for operating the catching part, a hook part provided on the main base so as to move between a locking position for locking the electronic device and an unlocking position for unlocking the electronic device, a second operation part provided on the main base for operating the hook part, a locking part provided detachably from the main base, a control plate movably provided in a plurality of places on the main base, and a lock object selecting part for operating to move the control plate. When the locking part mounted to the main base is locked with the control plate being in the first position, the locking part can not detach from the main base, movement of the hook part to the unlocking position is allowed, movement of the locking part to the unlocking position is restricted, and movement of the control plate from the first position to other positions is restricted.

When the locking part mounted on the main base is locked with the control plate being in the second position, the locking part can not detach from the main base, movement of the hook part to the unlocking position is allowed, movement of the locking part to the unlocking position is restricted, and movement of the control plate from the second position to other positions is restricted.

When the locking part mounted on the main base is locked with the control plate being in the third position, the locking part can not detach from the main base, movement of the hook part to the unlocking position is restricted, movement of the catching part to the unlocking position is restricted, and movement of the control plate from the second position to other positions is restricted.

With this structure, the control plate is restricted from moving to other positions, and the user can freely select a lock object.

The electronic device is a portable personal computer. The mechanical equipment is mechanical equipment for extending functions of the electronic device. The mechanical equipment for extending functions of the electronic device is housed in the accessory for mounting the electronic device, and the mechanical equipment for extending functions and the portable personal computer are combined so the computer can have functions of more than a single unit. Therefore, a conventional function extending device is not necessary and the unit can reduce its size and cost.

A plurality of mechanical equipment are housed in the main base. With this structure, two or more recording medium reproducing devices (such as a floppy disk driver and a CD-ROM driver) can be housed so that the electronic device further expands the functions. In this case, it is desired that the catching part and the first operation part are separately provided for each of the mechanical equipment housed in the main base. With this structure, each of the mechanical equipment is separately locked and unlocked, resulting in improved operability.

The locking part is a Kensington type one. The locking part of this type can be removed from the main base and the accessory can be carried out to any places when the locking part is unlocked. When the locking part is locked, it is locked to the main base and the accessory comprising the main base etc. can be prevented from being stolen.

The lock object selecting means is operated on the rear surface side of the main base. With this structure, other person except the user can not know the lock object easily.

BEST MODE FOR CARRYING OUT THE INVENTION

Figure 1:
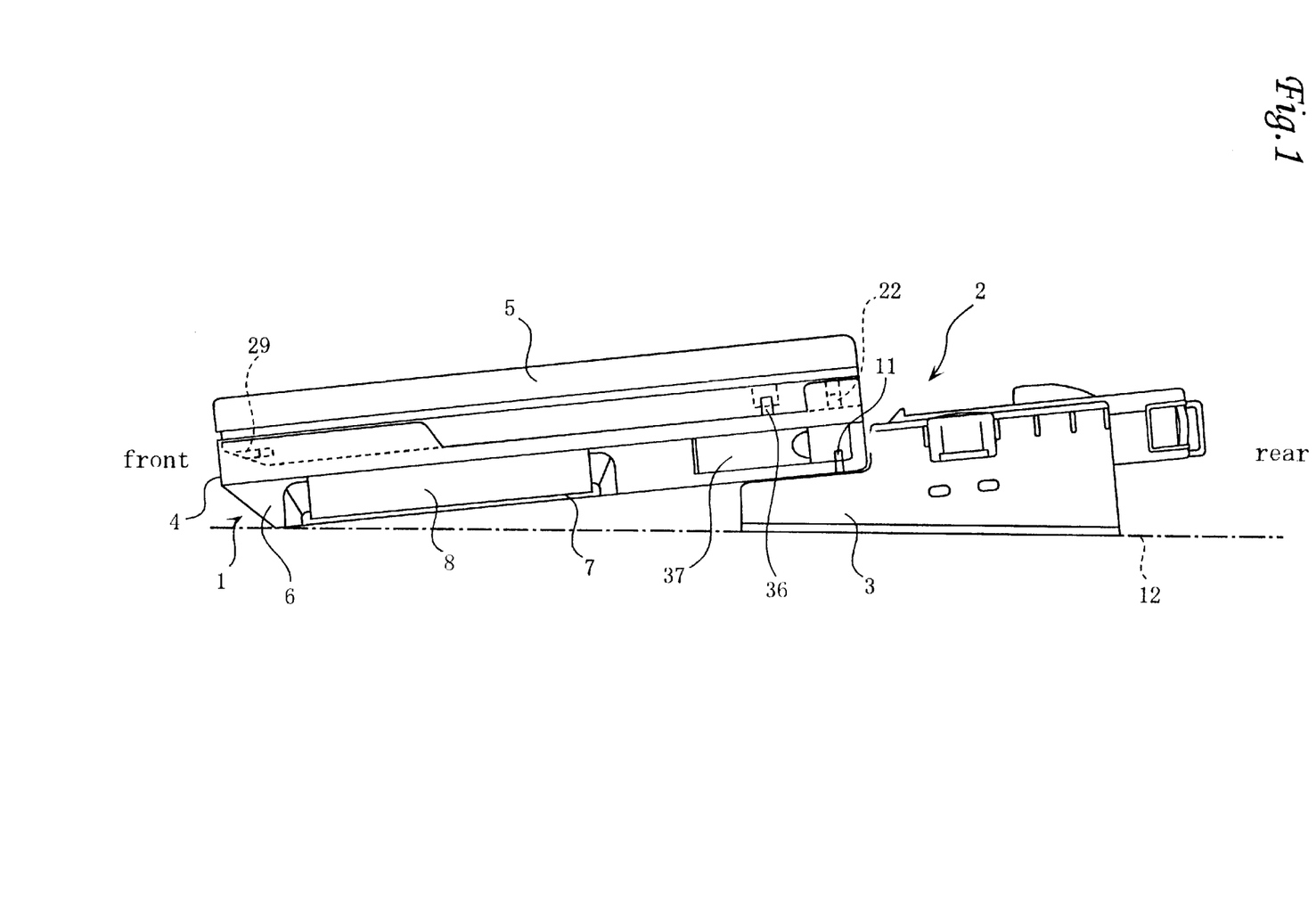
FIG. 1 is a side view of an accessory set on a function extending device and an electronic device mounted on the accessory.
Figure 2:
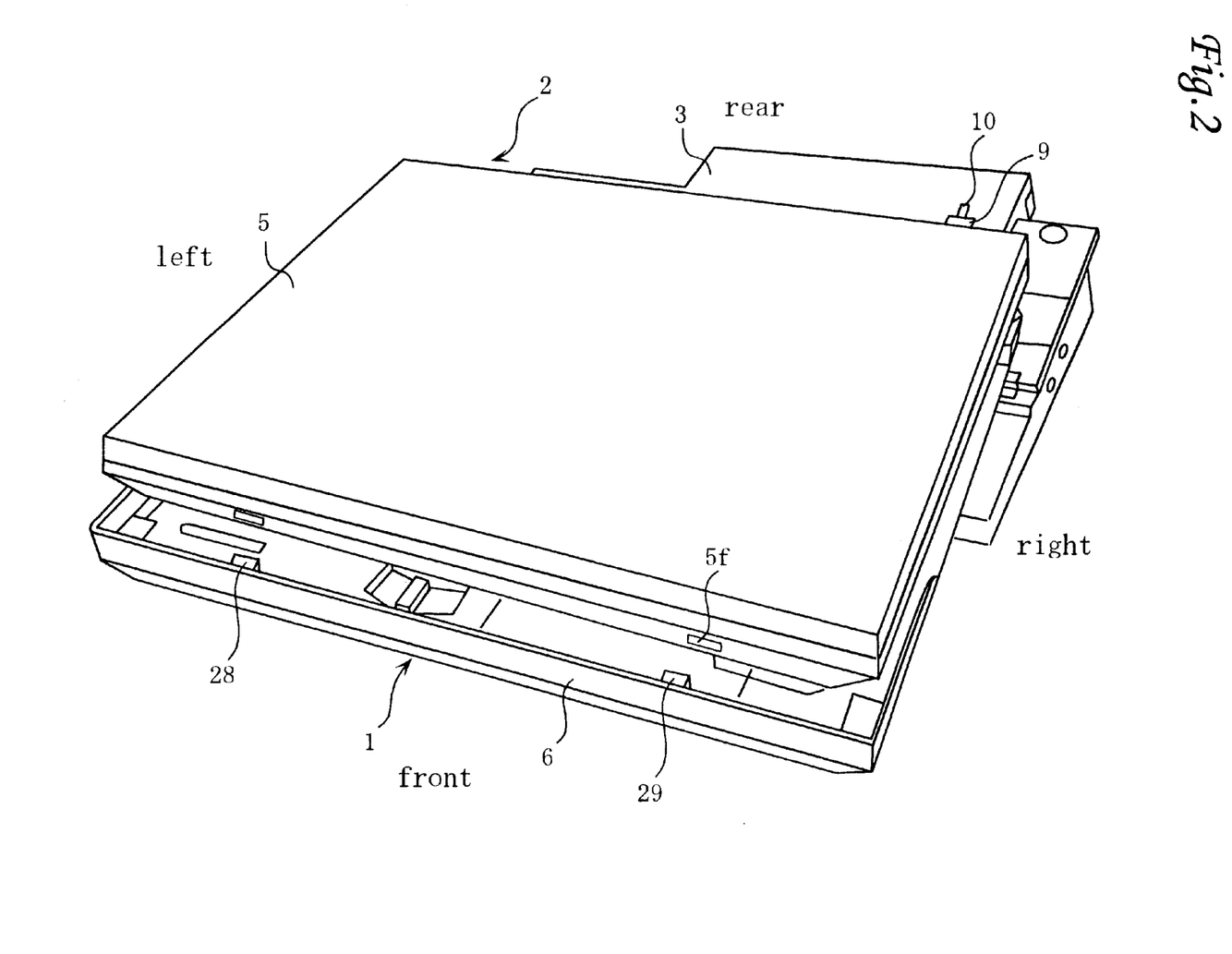
FIG. 2 is a perspective view of the accessory set on the function extending device and the electronic device to be mounted on the accessory.
Figure 3:
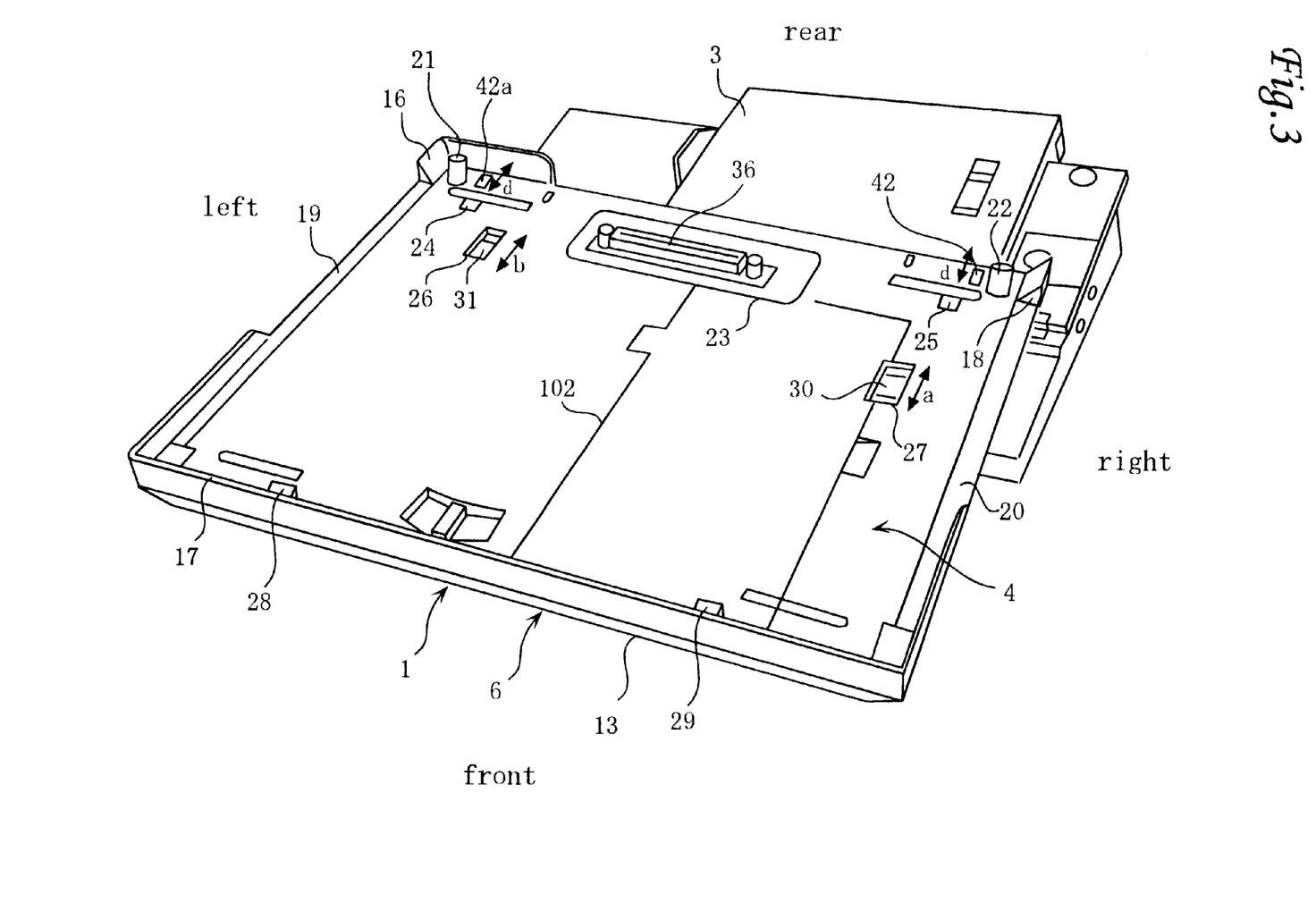
FIG. 3 is a perspective view of the accessory set on the function extending device.
Figure 4:
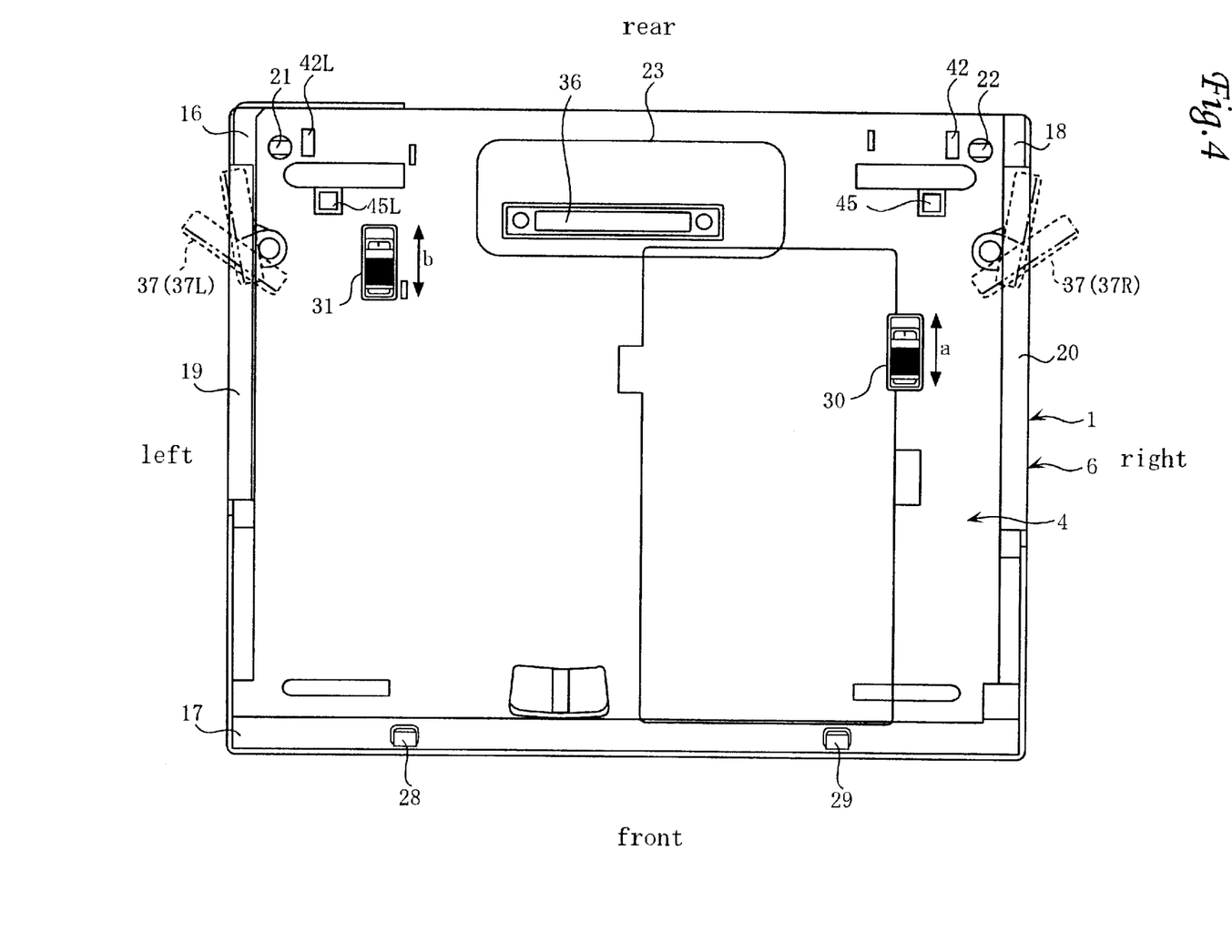
FIG. 4 is a plan view of the accessory.
Figure 5:
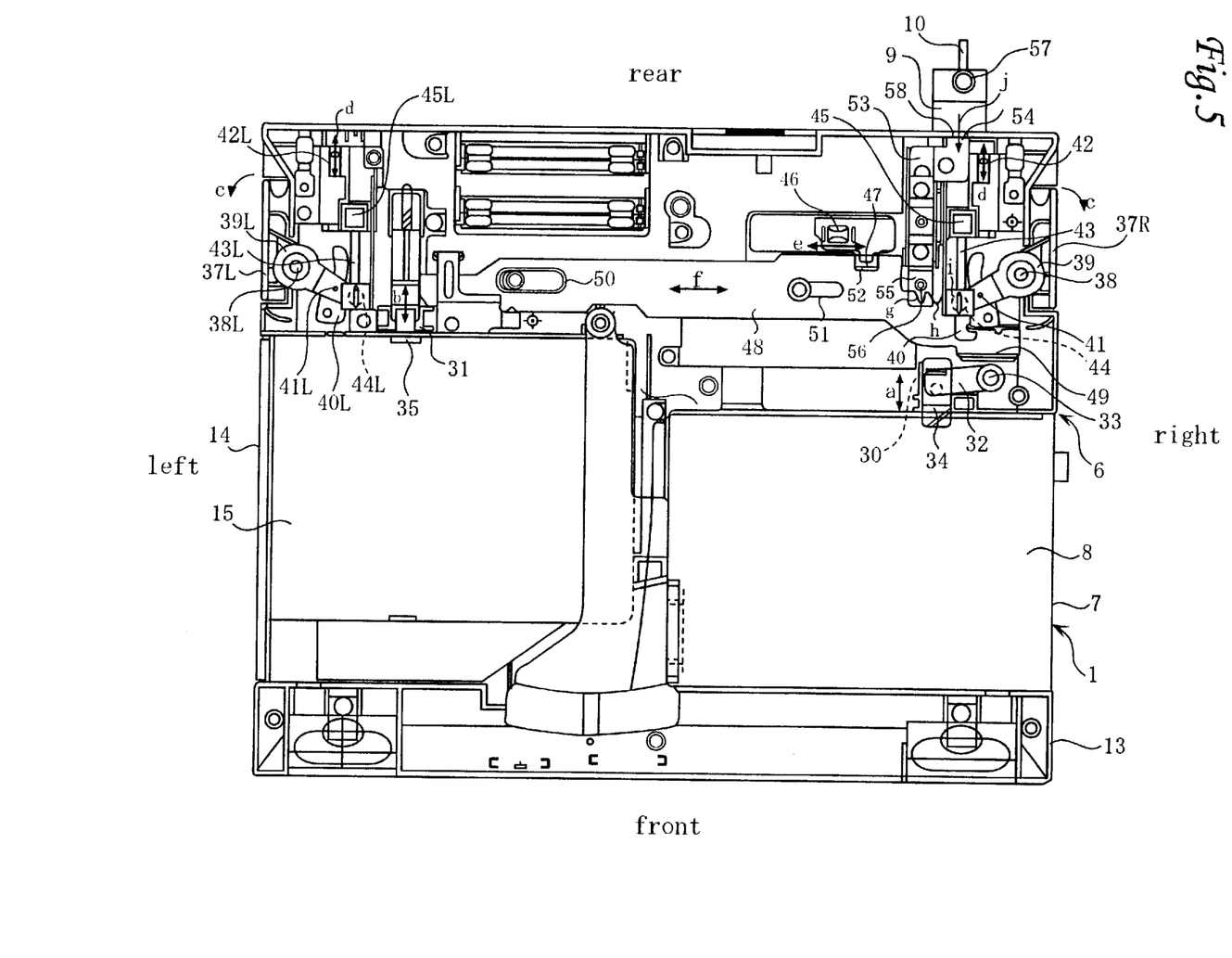
FIG. 5 is a plan view of an internal structure of the accessory (an unlocked state).

Explanation on an accessory of the embodiment according to the invention is made by referring to FIGS. 1–5. FIG. 1 is a side view illustrating a system using the accessory 1. FIG. 2 is a perspective view of the system 2. FIG. 3 is a perspective view of the accessory 1 and a function extending device 3. FIG. 4 is a plan view of the accessory 1. FIG. 5 is a plan view of the accessory 1 without a mounting part 4.

As shown in FIGS. 1, 2, the electronic device 5 such as a portable personal computer is mounted on a main base 6 of the accessory 1. An opening 7 is formed on a right side of the main base 6. Mechanical equipment 8 (e.g., a floppy disk driver) for extending functions of the electronic device 5 is housed in the main base 6 through the opening 7. An opening 14 (not shown in FIGS. 1, 2. See FIG. 5) is formed on a left side of the main base. Mechanical equipment 15 (e.g., a CD-ROM driver) is housed in the main base 6 through the opening 14. The locking part 9 is fixed on a rear part of the main base 6. The key 10 is inserted into the locking part 9.

The PCMCIA card or the like is inserted in the function extending device 3, and the function extending device 3 is provided with an USB terminal and a LAN connection terminal in suitable positions. A projection 11 is formed on a front upper side of the function extending device 3. When the projection 11 is inserted into a hole formed on a bottom surface of the main base 6, the function extending device 3 and the accessory 1 are connected. The accessory 1 is placed with its front side bottom surface contact with such as a desk 12. Mechanical equipment for extending functions of the electronic device 5 is installed in the accessory 1 and the function extending device 3. The extension system 2 is structured by connecting the electronic device 5, the accessory 1, and the function extending device 3. The system effectively functions even when only the accessory 1 and the electronic device 5 are joined. Furthermore, the electronic device 5 can be used separately when removed from the accessory 1, and is convenient for potable use.

As shown in FIGS. 3, 5, the main base 6 of the accessory 1 mainly comprises a base part 13 and the mounting part 4. The base part 13 is formed of such as plastic in a recessed shape with its upper part opened.

The mounting part 4 is formed of such as plastic, and side guide parts 16, 18 taller than a center part are formed on side edges. The front guide part 17 is formed on a front edge. Mounting surfaces 19, 20 formed on the side edges of the mounting part 4 are contact with a bottom surface of the electronic device 5. The projections 21, 22 projected in a vertical direction are formed on a rear upper surface of the mounting part 4, and projections 28, 29 projected in a horizontal direction are formed on the front guide part 17. Openings 23, 24, 25, 26, 27 are formed on predetermined positions of the mounting part 4. The mounting part 4 is provided on the base part 13 and is fixed to the base part 13 with small screws (not shown) inserted in predetermined positions.

As shown in FIG. 3, operation parts 30, 31 as first operation parts are provided on the upper surface of the mounting part 4. The operation part 30 is formed of such as plastic. The operation part 30 has an approximately rectangular shape in plan and has projections on the rear surface. The operation part 30 has an approximately "T" shape in viewing from a side. The operation part 30 is guided to a side edge of the opening 26 so as to move back and forth (in the a-direction). The operation part 31 is also formed of such as plastic. The operation part 31 has an approximately rectangular shape in plan and has projections on the rear surface. The operation part 31 has an approximately "T" shape in viewing from a side. The operation part 31 is guided to a side edge of the opening 26 so as to move back and forth (in the b-direction).

As shown in FIG. 5, the projection on the rear surface of the operation part 30 is engaged with a catching part driving plate 32. The catching part driving plate 32 is provided so as to horizontally rotate around an axis 33 formed on the base part 13. The catching part driving plate 32 rotates when the operation part 31 moves back and forth. A pin (illustrated by a broken line) is stood on the catching part driving plate 32, and is inserted in a hole formed on the catching part 34. The catching part 34 is guided to a guide formed on the base part 13 and moves back and forth when the catching part driving plate 32 rotates. A front end of the catching part 34 is notched slantly and is contact with the mechanical equipment 8 when the mechanical equipment 8 is inserted into the accessory 1, and then the catching part 34 slides backward.

When the operation part 30 moves back and forth, the catching part driving plate 32 rotates and the catching part 34 moves back and forth. To be concrete, when the operation part 30 moves backward, the catching part 34 moves backward and the front end of the catching part 34 is removed from a catching hole of the mechanical equipment 8. Through this operation, the mechanical equipment 8 is unlocked from the catching part 34 and the mechanical equipment 8 is removed from the accessory 1. When the operation part 30 moves forward, the catching part 34 also moves forward and a front end of the catching part is inserted into a catching hole of the mechanical equipment 8. The mechanical equipment 8 is caught by the catching part 34 and can not be removed from the accessory 1 merely by pulling out.

The projection formed on the rear surface of the operation part 31 is engaged with the catching part 35. The catching part 35 is guided by a guide formed on the base part 13 and moves back and forth when the operation part 31 moves back and forth. A front end of the catching part 35 is notched slantly and is contact with the mechanical equipment 15 when the mechanical equipment 15 is inserted into the accessory 1, and then the catching part 35 slides backward.

When the operation part 31 moves backward, the catching part 35 moves backward and the front end of the catching part 35 is released from the catching hole of the mechanical equipment 15. In connection with this, the mechanical equipment 15 is unlocked from the catching part 35 and the mechanical equipment can be taken out from the accessory 1. When the operation part 31 moves forward, the catching part 35 moves forward and the front end of the catching part 35 is inserted into the catching hole of the mechanical equipment 15. The mechanical equipment 15 is caught by the catching part 35 and can not be removed from the accessory 1 merely by pulling out.

In connection with the states of the operation parts 30, 31 (e.g., in a front or back position), the catching parts 34, 35 allow and inhibit the mechanical equipment 8, 15 from being taken out.

As shown in FIG. 3, a connection terminal 36 (e.g., a female connector) is provided on the base part 13 of the main base 6. The connection terminal 36 is projected approximately vertically to the surface of the mounting part 4 from the opening 23 formed on the mounting part 4. When the electronic device 5 is set to the accessory 1, the connection terminal 36 is inserted into a connection terminal (e.g., a male connector) of the electronic device 5 and both of the terminals are electrically connected.

As shown in FIG. 5, an operation lever 37 (37R) as a second operation part is provided on a rear side of the right side surface of the accessory 1, and an operation lever 37 (37L) also as a second operation part is provided on a rear side of the left side surface.

The operation lever 37 is formed of such as plastic. The operation lever 37R is provided so as to horizontally rotate around an axis 38 formed on the base part 13. The rotating plate 39 is formed of such as metal. The rotating plate 39 is provided so as to horizontally rotate around the axis 38 in connection with operation of the operation lever 37R. An upper pin 44 is fixed to the upper part of the rotating plate 39 and a lower pin 41 is fixed to the lower part.

The hook part driving plate 40 is formed of such as plastic. The lower pin 41 fixed to the rotating plate 39 is inserted in a hole formed on the hook part driving plate 40. The hook part driving plate 40 moves back and forth in connection with the rotation of the rotating plate 39 by the aid of the lower pin 41. The hook part 42 is formed of plastic or the like and is provided so as to energize forward and move back and forth (in a d-direction). An upper end of the hook part 42 is formed in a hook shape and is projected to an upper surface of the mounting part 4. The hook shaped upper end is engaged with a receiving part 60 of the electronic device 5 mounted on the mounting part 4 (see FIG. 7). A lower end (a bottom) of the hook part 42 is contact with a cam 41a (see FIG. 6). The movement of the hook part driving plate 40 is transmitted to the hook part 42 through the cam 41a. The cam 41a is provided so as to horizontally rotate and is supported by an axis fixed to the base part 13.

When the operation lever 37R is pulled to a C-direction (a direction for opening), the rotating plate 39 in connection with the operation lever 37R rotates clockwise. The rotation of the rotating plate 39 is transmitted to the hook part driving plate 40 by the lower pin 41, the hook part driving plate 40 moves backward, and the hook part 42 moves backward through the cam 41a. Through this movement, the hook part 42 is removed from the receiving part 60 of the electronic device 5 and the hook part 42 unlocks the electronic device.

When the operation lever 37R rotates to a direction opposite to the C-direction (a direction for closing), the rotating plate 39 rotates counterclockwise, and the hook part driving plate 40 and the hook part 42 move forward. With the movement, the hook part 42 is hung on the receiving part 60 of the electronic device 5 and locks the electronic device 5.

A ejecting part driving plate 43 is formed of such as plastic. The ejecting part driving plate 43 is formed in a rectangular shape long in back and forth directions, and has an inclining part of which the front side is taller than the back side. The upper pin 44 fixed to the rotating plate 39 is inserted into a front end of the ejecting part driving plate 43 and the ejecting part driving plate 43 moves back and forth in accordance with the rotation of the rotating plate 39. The ejecting part is formed of such as plastic and has an approximately rectangular solid shape. The ejecting part 45 is guided by peripheral mechanical equipment and moves in up and down directions. A bottom surface of the ejecting part 45 is contact with the inclining part of the ejecting part driving plate 43 and moves upward and downward in accordance with back and forth movement of the ejecting part driving plate 43. When the ejecting part 45 moves upward, it projects from the mounting part 4. When the ejecting part 45 moves downward, it forms an approximately a plan face with the mounting part 4.

When the operation lever 37R rotates to a direction opposite to the C-direction (the direction for closing), the rotating plate 39 rotates counterclockwise, the ejecting driving plate 43 moves forward, and the ejecting part 45 moves downward and does not project from the mounting part 4.

When the operation lever 37R is pulled to the C-direction (the direction for opening), the rotating plate 39 rotates clockwise, the ejecting driving plate 43 moves backward, and the ejecting part 45 moves upward and projects from the mounting part 4. The ejecting part 45 projects from the mounting part 4 and pushes up the electronic device 5 when the operation lever 37R is pulled up to the C-direction (the direction for opening). Furthermore, the hook part 42 unlocks the electronic device 5. Through this series of operation, the accessory is ejected.

In accordance with the operation status of the operation lever 37L arranged on a left side of the base part 13 (e.g., an opened/closed state), the hook part 42L locks and unlocks the electronic device 5. For example, when the operation lever 37L is rotated to the C-direction (the direction for opening) around the axis 38L, the rotating plate 39L rotates counterclockwise. Then, the lower pin 41L of the rotating plate 39L moves the hook part driving plate 40L backward, the hook part 42L moves backward by the aid of the cam 41La, and the hook part 42L unlocks the electronic device 5. Furthermore, the ejecting part driving plate 43L moves backward by the aid of the upper pin 44L fixed to the rotating plate 39L and the pressing part 45L projects from the mounting part 4 so that the electronic device 5 is pushed up.

A lock object selecting part 46 is formed of such as plastic. As shown in FIG. 5, it is guided to an edge of an opening formed on a bottom surface of the base part 13 and is provided movably in left and right directions (an e-direction). The lock object selecting part 46 is provided on a rear side of the main base 6 and is operated at the rear side of the main base 6. A projection 47 projected on a front side is formed on the lock object selecting part 46. The projection 47 is engaged with the control plate 48.

The control plate 48 is formed of such as metal and has an elongated shape in left and right directions. A folded part 49 folded downward is formed on a right front side of the control plate 48, and long holes 50, 51 elongated in left and right directions are formed on suitable positions. The pins fixed to the base part 13 are respectively inserted into the long holes 50, 51 and the control plate 48 is guided to the pins and is movable to left and right directions (the f-direction). A recessed part 52 is formed on a rear edge on an approximately center part of the control plate 48, and the projection 47 is inserted into the recessed part 52. Three recessed parts (g, h, i) are horizontally formed on a right rear edge of the control plate 48.

A moving plate 53 is formed of such as metal and is provided so as to move back and forth. The moving plate 53 comprises a contact part 54 for contacting with a tip part 58 of the locking part 9 and a moving part 55 connected with the contact part 54. A pin 56 is fixed to a rear surface of the front end of the moving part 55. The pin 56 is engaged with either of the three recessed parts (g, h, i) in accordance with the position of the control plate 48.

The Kensington type one is used as the locking part 9 for example. An end of a chain (not shown) is fixed to the projection 57 provided on an outer surface of a cylinder, and another end of the chain is fixed to a fixing tool (not shown) provided on a desk 12 or a drawer for example. Even when a key 10 is inserted in the locking part 9 but is not rotated (see FIG. 5), the locking part 9 is in an unlocked state and the locking part 9 and the base part 13 are not fixed. Therefore, the locking part 9 can be removed.

The contact part 54 is pressed in the j-direction by the aid of the tip part 58 of the locking part 9 irrespective of whether the locking part locks or unlocks by inserting the locking part 9 into the long hole (not shown) of the base part 13. The tip part 58 of the locking part 9 is formed in a shape corresponding to the long hole of the base part 13 and is capable of rotating around the axis (not shown). A fixing part is formed on upper and lower end side in an elongated diameter direction in an interval between the end surface and the tip part 58 of the locking part 9. The tip part 58 and the fixing part are inserted in the long holes of the base part 13, and the key 10 is rotated by 90 degrees so that only the tip part 58 rotates by 90 degrees. Therefore, the locking part 9 can not rotate because the tip part 58 is engaged with the long hole, and the tip part 58 is positioned orthogonal to the long hole. Therefore, the locking part 9 can not be pulled out from the base 9 (the locked state).

When the locking part 9 locks, the accessory 1 can move as long as the length of the chain and can be prevented from being stolen. The tip part 58 is pressed and the moving plate 53 moves forward so that engagement of the pin 56 and either of the three recessed parts (g, h, i) can be maintained (the locked state). Even when the key 10 is pulled out, the locked state is maintained.

Figure 6:
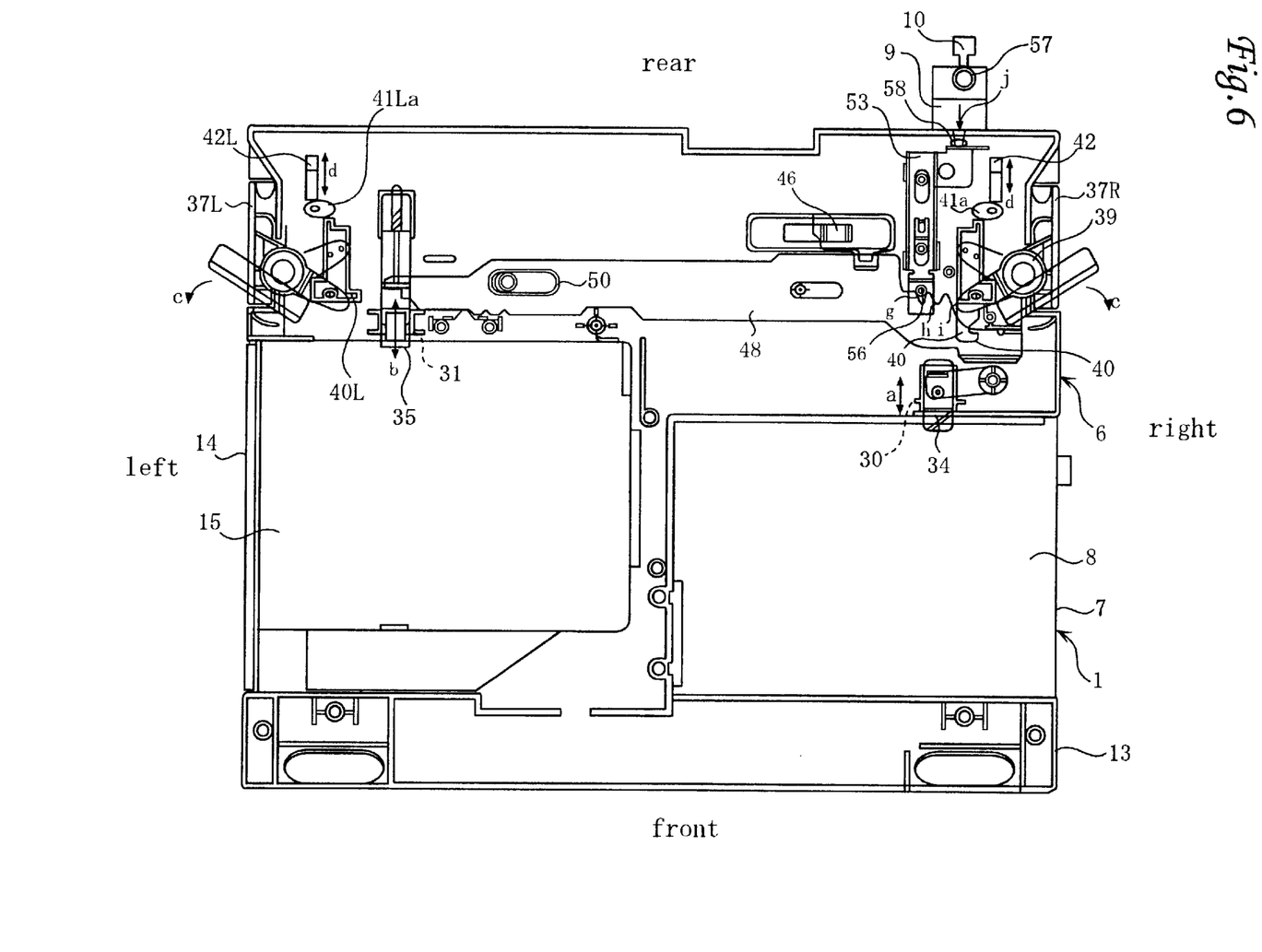
FIG. 6 is a plan view schematically illustrating the internal structure of the accessory with a control plate being locked in a second position.
Figure 7A:
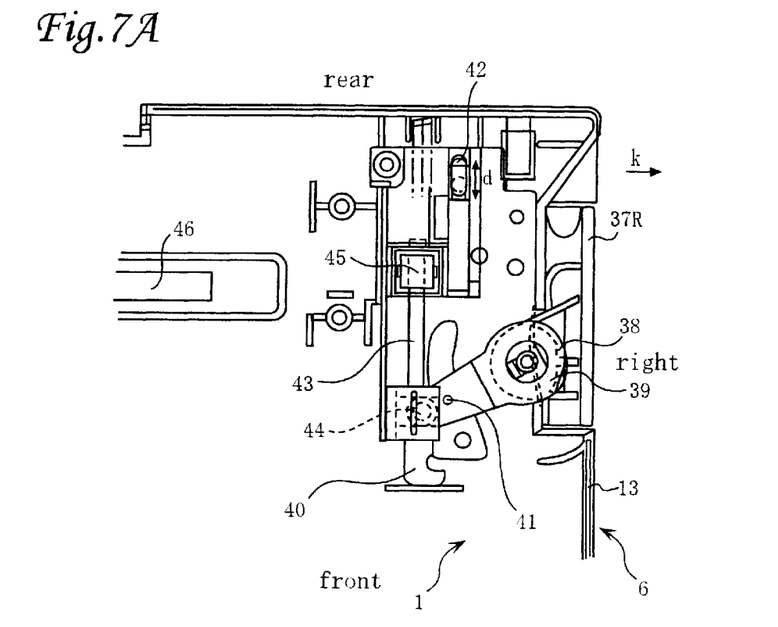
FIG. 7(a) is an enlarged view of an operation lever etc. of the accessory.
Figure 7B:
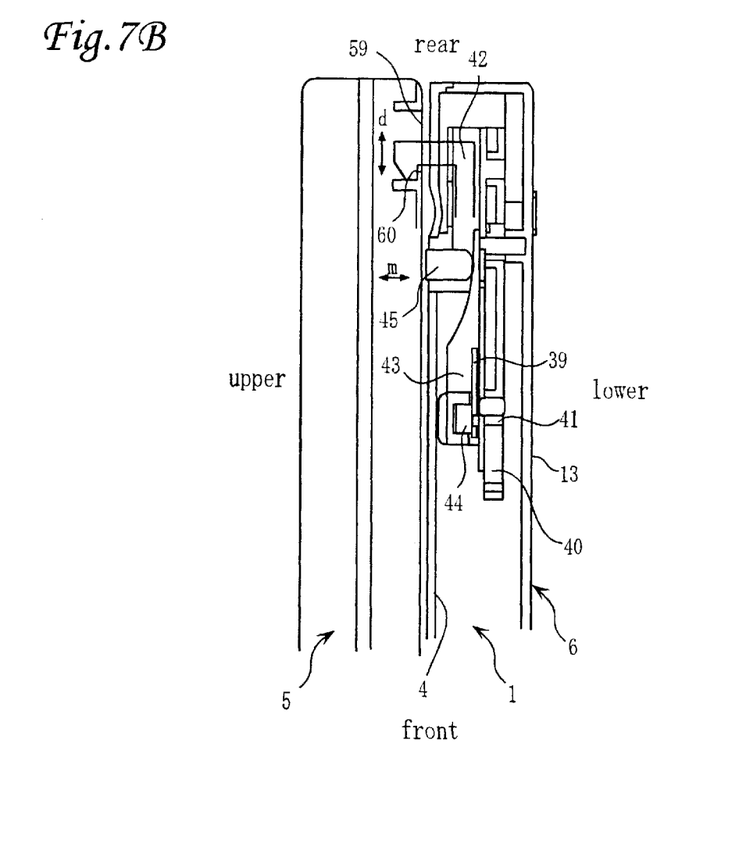
FIG. 7(b) is a plan view of a state that the control plate is in the second position and is locked.
Figure 8A:
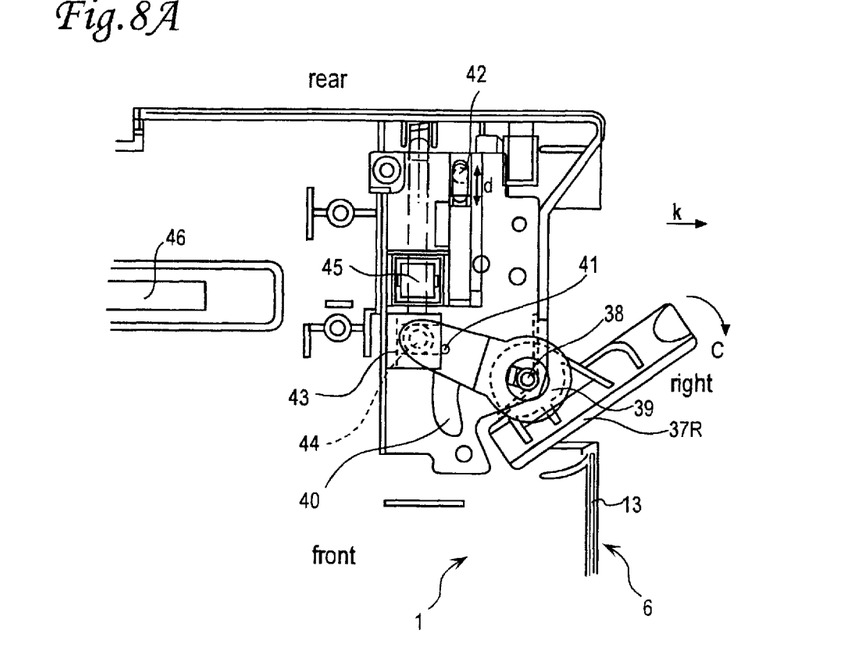
FIG. 8(a) is an enlarged view of the accessory with the operation lever fully opened.
Figure 8B:
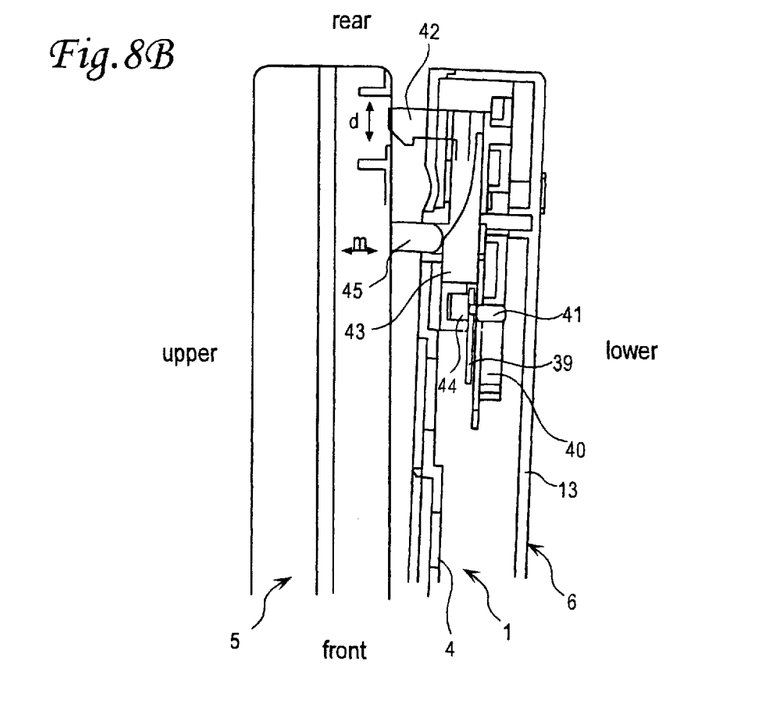
FIG. 8(b) is a side view corresponding to FIG. 8(a).
Figure 9:
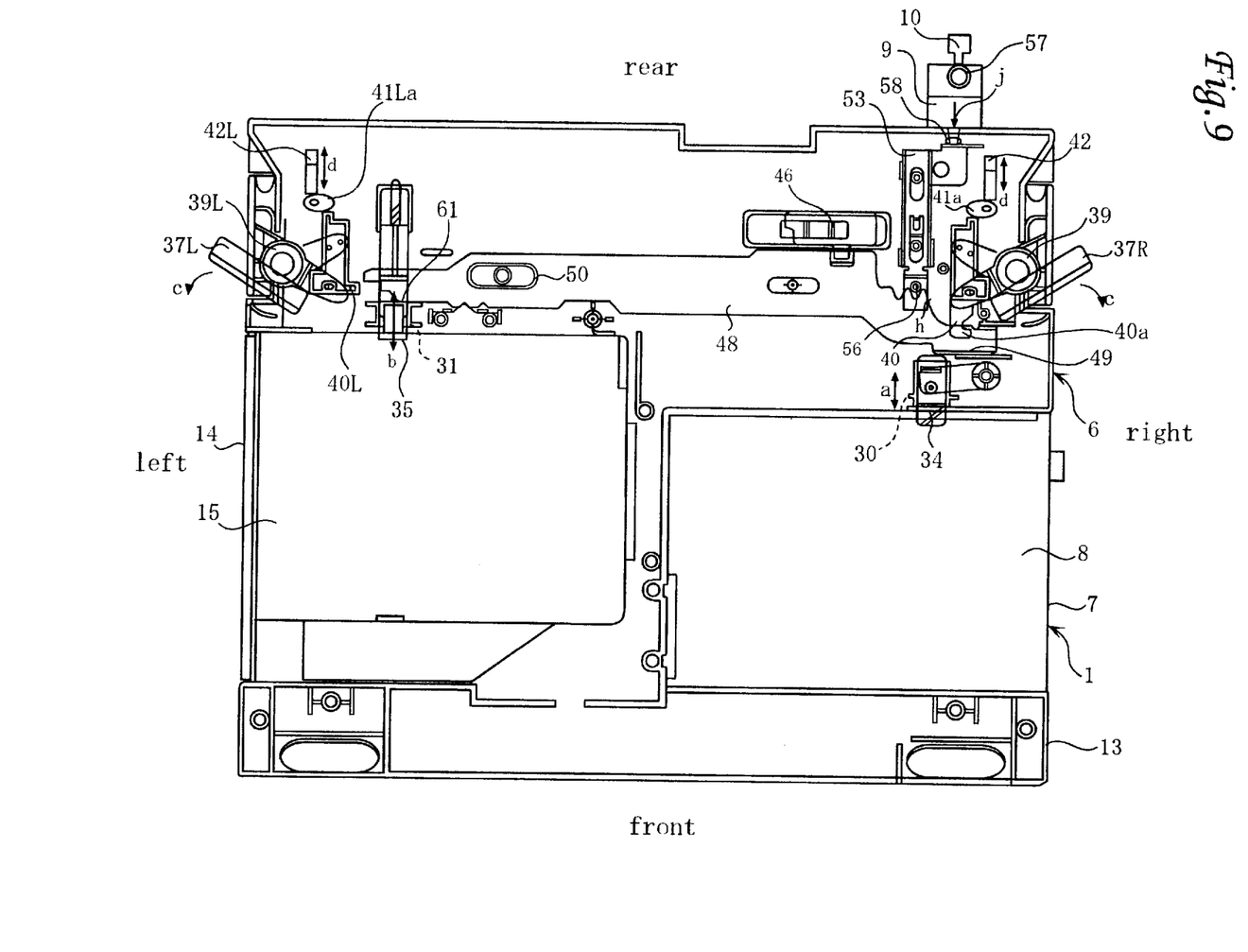
FIG. 9 is a schematic view of the internal structure of the accessory with the control plate being locked in the third position.
Figure 10:
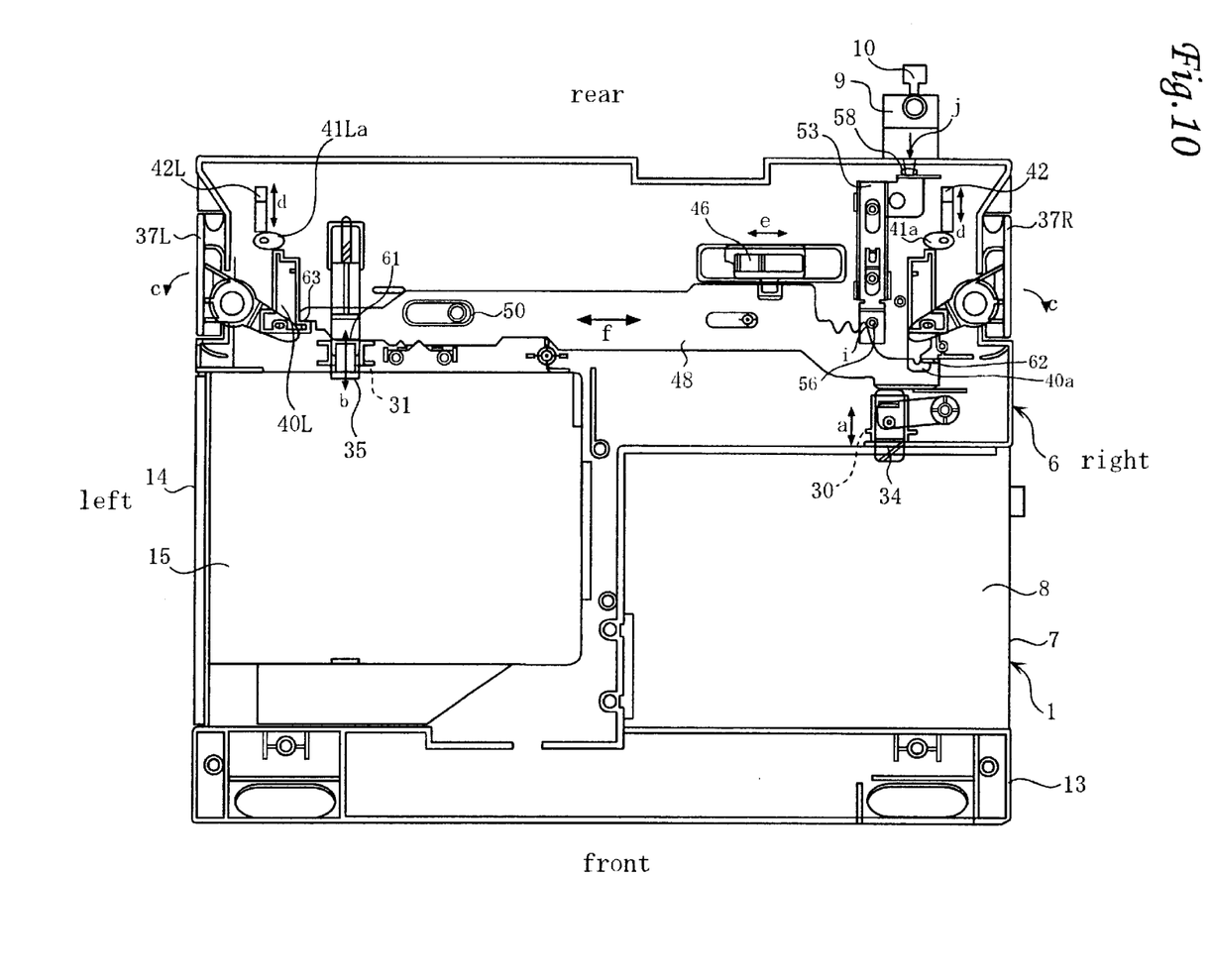
FIG. 10 is a schematic view of the internal structure of the accessory with the control plate being locked in the first position.

Explanation on movement of the accessory 1 is made by referring to FIGS. 1–10. FIG. 6 is a plan view of the accessory 1 with the pin 56 locked with the recessed part (g) (a first position). FIG. 7(*a*) is a partial plan view of FIG. 6. FIG. 7(*b*) is a cross partal view of FIG. 7(*a*) with the operation part 37 in the closed state. FIG. 8(*a*) is a partial plan view of FIG. 6. FIG. 8(*b*) is a cross partal view of FIG. 8(*a*) with the operation part 37 in the open state. FIG. 9 is a plan view of the accessory 1 with the pin 56 locked with the recessed part (h) (a second position). FIG. 10 is a plan view of the accessory 1 with the pin 56 engaged with the recessed part (i) (a third position).

(Description on the first position; the recessed part (g) corresponds to the pin 56)

The lock object selecting part 46 is operated in the state that the locking part 9 is removed from the base part 13, and the recessed part (g) of the control plate 48 is made to correspond with the pin 56. The following operation can be performed in the state that the recessed part (g) of the control plate 48 corresponds to the pin 56. It is noted that when the recessed part (g) of the control plate 48 is not engaged with the pin 56, operation of the lock object selecting part 46 is allowed, and the lock object selecting part 46 is operated, allowable operation may change. When locking operation is performed by the key 10 with the locking part 9 set to the base part 13, the pin 56 of the moving plate 53 enters the recessed part (g) of the control plate 48 to lock the control plate 48, and the operation of the lock object selecting part 46 is inhibited. Therefore, change from the first position to other positions can be inhibited.

The function extending device 3 is placed on the desk 12 and the accessory 1 is mounted on the function extending device 3 so that the projection 11 is inserted in the hole of the main base 6 (see FIGS. 1, 2). The mechanical equipment 8 is housed in the accessory 1 from the opening of the accessory 1 and is engaged by moving the operation part 30 forward. As the same, the mechanical equipment 15 is housed in the accessory 1 from the opening 14 of the accessory 1 and is engaged by moving the operation part 31 forward.

The electronic device 5 is mounted on the accessory 1 with the operation lever 37 closed. At that time, the protrusions 21, 22 are respectively engaged with holes formed on a bottom surface of the electronic device 5. The hook part 42 is movable in front and back directions (the d-direction) and the hook shaped tip of the hook part 42 is pushed by the electronic device 5 mounted on the mounting part 4 and the hook part 42 moves backward. When the hook shaped tip of the hook part 42 fully enters in the hole 59 of the electronic device 5 (see FIG. 7), the hook part 42 moves forward and the hook shaped tip is engaged with the receiving part 60. When the operation lever 37 is closed, the ejecting part driving plates 43, 43L are positioned on a front side and the ejecting parts 45, 45L are positioned on the lowermost part in the up and down directions (the m-direction). Therefore, the electronic device 5 is not ejected and is stably fixed to the accessory 1.

In the first position, the operation lever 37 can rotate to the c-direction and the electronic device 5 can be removed without unlocking the locking part 9. When the electronic device 5 is removed, the mounting part 4 of the accessory 1 and the operation parts 30, 31 are exposed. It is not necessary to unlock the locking part 9 in order to operate the operation parts 30, 31. In removing the mechanical equipment 8, the operation part 30 is slid backward. Then, the catching part driving plate 32 rotates a little and the catching part 34 moves backward. Through the operation, the mechanical equipment 8 is unlocked from the catching part 34 and the mechanical equipment 8 can be removed from the accessory 1. In order to remove the mechanical equipment 15, the operation part 31 is slid backward and the catching part 35 moves backward. The mechanical equipment 15 is unlocked from the catching part 35 and is removed from the mechanical equipment 15.

As described above, the operation parts 30, 31 ad the operation levers 37R and 37L are allowed to be operate even when the locking part 9 is locked in the first position. In the first position, the operation parts 30, 31 are allowed to be operated and the mechanical equipment 8, 15 are mounted to and removed from the accessory 1 without unlocking the locking part 9. Furthermore, operation for opening the operation lever 37R is allowed and the electronic device 5 is unlocked form the hook part 42 without unlocking the locking part 9 to move the ejecting part 45 upward and eject the electronic device 5. The accessory 1 is allowed to move within the length of the chain and the locking part 9 prevents the accessory 1 from being stolen.

(Explanation on the second position: the recessed part (h) corresponds to the pin 56)

The lock object selecting part 46 is operated with the locking part 9 removed from the base part 13 and the recessed part (h) of the control plate 48 corresponds to the pin 56 as shown in FIG. 9. Following operation is performed when the recessed part (h) of the control plate 48 corresponds to the pin 56. In this case, it is noted that operation of the lock object selecting part 46 is allowed when the pin 56 is not locked to the recessed part (h) of the control plate 48. Therefore, when the lock object selecting part 46 is operated, allowable operation may change. When the locking part 9 is set to the base part 13 and the key 10 performs locking operation, the pin 56 of the moving plate 53 enters in the recessed part (h) of the control plate 48 to lock the control plate 48. Thus, operation of the lock object selecting part 46 is inhibited and change from the second position to other positions is inhibited.

In the second position, the folding part 49 of the control plate 48 is contact with the rear part of the catching part 34 and the operation part 30 does not slide backward. Therefore, the mechanical equipment 8 maintains to be locked. Furthermore, a protrusion (not shown) is formed on a rear surface of the catching part 35 and is contact with an edge part 61 of the control plate 48. Therefore, the operation part 31 can not slide backward and the locking state of the mechanical equipment can not be released.

As described above, when the control plate 48 is in the second position through the operation of the lock object selecting part 46, the operation parts 30, 31 do not operate and the mechanical equipment 8, 15 can not be released from the locking state. Therefore, the mechanical equipment 8, 15 can not be removed and can be prevented from being stolen.

The operation levers 37R, 37L can be operated without unlocking the locking part 9. When the operation levers 37R, 37L are pulled to the C-direction, the rotating plate 39 rotates clockwise, the rotating plate 39L rotates counterclockwise, the hook part driving plates 40, 40L move backward, the cams 41a, 41La rotate, the hook parts 42, 42L move backward, and the hook parts 42, 42L move backward to unlock the electronic device 5. Furthermore, the ejecting driving plates 43, 43L move backward, the ejecting parts 45, 45L rise to push up the electronic device 5.

Therefore, the control plate 48 is in the second position by the aid of the lock object selecting part 46 and the locking part 9 is locked, the electronic device 5 is mounted to and removed from the accessory 1 without unlocking the locking part 9. In addition, even when the operation parts 30, 31 are exposed after removing the electronic device 5 from the accessory 1, the operation parts can not be operated and the mechanical equipment 8, 15 can be prevented from being stolen. The accessory 1 moves within the length of the chain when the locking part 9 is locked and the accessory 1 can be prevented from being stolen.

(Explanation on the third position: the recessed part (i) corresponds to the pin 56)

The lock object selecting part 46 is operated with the locking part 9 removed from the base part 13, and the recessed part (i) of the control plate 48 is corresponded to the pin 56 as shown in FIG. 10. Following operation can be performed when the recessed part (i) of the control plate 48 corresponds to the pin 56. In this case, it is noted that operation of the lock object selecting part 46 is allowed when the recessed part (i) of the control plate 48 is not engaged with the pin 56. Therefore, when the lock object selecting part 46 is operated, allowable operation may change. When the locking part 9 is set to the base part 13 and the key 10 performs locking operation, the pin 56 of the moving plate 53 enters in the recessed part (i) of the control plate 48 and the control plate 48 is locked to inhibit operation of the lock object selecting part 46 and change from the third position to other positions.

In the third position, a folding part 49 of the control plate 48 is contact with a rear part of the catching part 34 and the operation part 30 can not slide backward so that the locking state of the mechanical equipment 8 can not be released. A protrusion (not shown) is formed on the rear surface of the engaging part 36, and is contact with the edge part 61 of the control plate 48. Therefore, the operation part 31 can not slide backward and the locked state of the mechanical equipment 15 can not be released.

In the third position, the hook shaped part 40a formed on a front tip of the hook part driving plate 40 is locked with the folding part 62 of the control plate 48, and the hook part driving plate 40 can not move backward.

Therefore, even when trying to open the operation lever 37R, the lever does not open over predetermined degrees. The hook part driving plate 40 can not move and the hook part 42 can not move backward, and thus the locked state of the electronic device 5 can be maintained. Furthermore, the ejecting driving plate 43 corresponding to the operation lever 37R can not move backward and the ejecting part 45 can not rise. Thus the electronic device 5 can be pushed up.

As like this, a step part formed on a right edge of the hook part driving plate 40L locks with a step part 63 formed on a left edge of the control plate 48, and the hook part driving plate 40L can not move backward.

Therefore, even when trying to open the operation lever 37L, the lever does not open over a predetermined degree. Because the hook part driving plate 40L does not move, the hook part 42L can not move backward and the locking state of the electronic device 5 can be maintained. Furthermore, because the ejecting part driving plate 43L moving in connection with the operation lever 37L can not move backward, the ejecting part 45L can not rise and the electronic device 5 can not be pushed up.

When the control plate 48 is in the third position by operating the lock object selecting part 46, the locking states of the mechanical equipment 8, 15 can not be released and the mechanical equipment can not be removed. Furthermore, the operation lever 37 is restricted from rotating so that the electronic device 5 can not be ejected. Because the lock object selecting part 46 can not be operated by locking the locking part 9, the electronic device 5 and the mechanical equipment 8, 15 are securely prevented from being stolen. The accessory 1 can move within the length of the chain when the locking part 9 is locked, and the accessory 1 can be prevented from being stolen.

In order to unlock the mechanical equipment 8, 15 housed in the housing part, the operation parts 30, 31 are used. In order to unlock the electronic device 5, the operation lever 37 is used. Therefore, the electronic device 5 and the mechanical equipment are separately unlocked, and furthermore a special key conventionally required is not necessary. Therefore, operability can be improved. In addition, the lock object selecting means (comprising the lock object selecting part 46 and the control plate 48) enables selection between movement for restricting operation only of the operation parts 30, 31 (restricting removal of the mechanical equipment 8, 15) and allowing the operation of the operation lever 37 (enabling removal of the electronic device 5) and movement for restricting operation of both of the operation parts 30, 31 and the operation lever 37. That is, a lock object can be freely selected. The accessory 1 can be prevented from being stolen by connecting the locking part 9 and a desk or the like with a chain.

Operation of the operation parts 30, 31 and the operation lever 37 by the lock object selecting part 46 are allowed and inhibited irrespective of locking or unlocking of the locking part 9. Therefore, the electronic device 5 can be locked and unlocked in accordance with operation of the operation lever 37 irrespective of locking states. Therefore, a key is not necessary and operability can be improved.

When the locking part 9 is locked, position operation of the lock object selecting part 46 can not be performed. Therefore, when the lock object is selected and the locking part 9 is locked, the lock object selecting part 46 is prevented from operating to change positions in order to change a lock object or release a lock object. Thus, the electronic device 5 and the mechanical equipment 8, 15 can be securely prevented from being stolen. On the other hand, when the lock object is selected and the locking part 9 is locked by the lock object selecting part 46, it is not necessary to unlock the locking part 9 to remove the mechanical equipment which is not a lock object and inconvenience caused by unlocking operation is avoided.

When a portable personal computer as the electronic device 5 is used with a floppy disk driver and a CD-ROM driver or the like as mechanical equipment for extending functions of the electronic device housed in the accessory 1, the personal computer can function more than a personal computer itself. Therefore, conventional function extending device is not necessary and a size of the unit and the cost for the unit can be reduced.

The main base 6 houses a plurality of mechanical equipment (a floppy disk driver, a CD-ROM driver etc.) to further extend functions of the electronic device. In this case, the operation parts 30, 31 and the catching parts 34, 35 are separately provided for each of the mechanical equipment housed in the main base 6. Therefore, each of the mechanical equipment can be separately locked and unlocked and operability can further improve.

Because the Kensington type one is used as the locking part 9, the accessory can be carried to any places by removing the locking part 9 from the main base. When the locking part 9 is locked with the main base 6, the accessory 1 including the main base 6 or the like can be prevented from being stolen.

The lock object selecting part 46 is so structured that it can be operated on a rear surface side of the main base, and others except for a user can not know easily the locked object.

Industrial applicability

As described above, the accessory of the electronic device according to this invention extends functions of the electronic device, improves operability in mounting and removing the electronic device or the like, and further prevents the electronic device from being stolen.

What is claimed is:

1. An accessory of an electronic device comprising:
    a main base including a mounting part for mounting an electronic device and a housing part for housing mechanical equipment,
    a catching part provided on the main base so as to move between a locking position for locking the mechanical equipment housed in the housing part and an unlocking position for unlocking the mechanical equipment,
    a first operation part provided on the main base for operating the catching part,
    a hook part provided on the main base so as to move between a locking position for locking the electronic device and an unlocking position for unlocking the electronic device,
    a second operation part provided on the main base for operating the hook part,
    a locking part provided detachably from the main base, and
    a lock object selecting means for changing a combination of operation allowance and operation inhibition of the first operation part and the second operation part by position operation.

2. The accessory of the electronic device according to claim 1, wherein
    the operation allowance and the operation inhibition of the first operation part and the second operation part by the lock object selecting means is achieved irrespective of locking and unlocking of the locking part.

3. The accessory of the electronic device according to claim 2, wherein
    position operation of the lock object selecting means is not performed when the locking part is locked.

4. An accessory of an electronic device comprising:
    a main base including a mounting part for mounting an electronic device and a housing part for housing mechanical equipment, a catching part provided on the main base so as to move between a locking position for locking the mechanical equipment housed in the housing part and an unlocking position for unlocking the mechanical equipment, a first operation part provided on the main base for operating the catching part, a hook part provided on the main base so as to move between a locking position for locking the electronic device and an unlocking position for unlocking the electronic device, a second operation part provided on the main base for operating the hook part, a locking part provided detachably from the main base, a control plate movably provided in a plurality of places on the main base, and a lock object selecting part for operating to move the control plate, wherein when the locking part mounted to the main base is locked with the control plate being in the first position, the locking part can not detach from the main base, movement of the hook part to the unlocking position is allowed, movement of the catching part to the unlocking position is allowed, and movement of the control plate from the first position to other positions is restricted.

5. An accessory of an electronic device comprising:

a main base including a mounting part for mounting an electronic device and a housing part for housing mechanical equipment, a catching part provided on the main base so as to move between a locking position for locking the mechanical equipment housed in the housing part and an unlocking position for unlocking the mechanical equipment, a first operation part provided on the main base for operating the catching part, a hook part provided on the main base so as to move between a locking position for locking the electronic device and an unlocking position for unlocking the electronic device, a second operation part provided on the main base for operating the hook part, a locking part provided on the main base, a control plate movably provided in a plurality of places on the main base, and a lock object selecting part for operating to move the control plate, wherein when the locking part mounted on the main base is locked with the control plate being in the second position, the locking part can not detach from the main base, movement of the hook part to the unlocking position is allowed, movement of the catching part to the unlocking position is restricted, and movement of the control plate from the second position to other positions is restricted.

6. An accessory of an electronic device comprising a main base including a mounting part for mounting an electronic device and a housing part for housing mechanical equipment, a catching part provided on the main base so as to move between a locking position for locking the mechanical equipment housed in the housing part and an unlocking position for unlocking the mechanical equipment, a first operation part provided on the main base for operating the catching part, a hook part provided on the main base so as to move between a locking position for locking the electronic device and an unlocking position for unlocking the electronic device, a second operation part provided on the main base for operating the hook part, a locking part provided on the main base, a control plate movably provided in a plurality of places on the main base, and a lock object selecting part for operating to move the control plate, wherein when the locking part mounted on the main base is locked with the control plate being in the third position, the locking part can not detach from the main base, movement of the hook part to the unlocking position is restricted, movement of the catching part to the unlocking position is restricted, and movement of the control plate from the second position to other positions is restricted.

7. The accessory of the electronic device according to claims 1, 2, 3, 4, 5, or 6, wherein the electronic device is a portable personal computer.

8. The accessory of the electronic device according to claim 1, 3, 4, 5 or 6, wherein the mechanical equipment is mechanical equipment for extending functions of the electronic device.

9. The accessory of the electronic device according to claim 1, 3, 4, 5 or 6, wherein a plurality of the mechanical equipment are housed in the main base.

10. The accessory of the electronic device according to claim 9, wherein the catching part and the first operation part are separately provided for each of the mechanical equipment housed in the main base.

11. The accessory of the electronic device according to claim 1, 3, 4, 5 or 6, wherein the locking part is a Kensington type one.

12. The accessory of the electronic device according to claim 1, 3, 4, 5 or 6, wherein the lock object selecting means is so structured that it is operated on a rear surface side of the main base.

* * * * *